United States Patent [19]

Slaven

[11] 3,759,546
[45] Sept. 18, 1973

[54] FIFTH WHEEL COUPLER ASSEMBLY
[76] Inventor: John Greenwood Slaven, 17 Highbank Rd., Kingsley, England
[22] Filed: Oct. 18, 1971
[21] Appl. No.: 190,072

[52] U.S. Cl............................. 280/434, 280/432
[51] Int. Cl............................................ B62d 53/08
[58] Field of Search..................... 280/434, 435, 432

[56] References Cited
UNITED STATES PATENTS

| | | | |
|---|---|---|---|
| 1,991,507 | 2/1935 | Ketel | 280/434 |
| 2,726,878 | 12/1955 | Fontaine | 280/434 |
| 2,756,074 | 7/1956 | Kayler | 280/437 |
| 3,063,738 | 11/1962 | Becker | 280/434 |
| 3,079,175 | 2/1963 | Walther | 280/434 |
| 3,171,672 | 3/1965 | Dalton | 280/437 |
| 3,314,691 | 4/1967 | Georgi | 280/434 |

*Primary Examiner*—Leo Friaglia
*Attorney*—Mack D. Cook, II

[57] ABSTRACT

A fifth wheel coupler assembly having a coupler jaw pivotally mounted beneath the top plate at one side of the king pin slot. A gate arm of the jaw swings across the rear of the slot to engage a king pin. A locking bar having a sliding pivot maintains the king pin in coupled condition. A sensor arm also projects into the slot when the assembly is in open or king pin receiving condition and has an orientation such that the jaw will not close if the king pin is in a position so as to not correctly engage with the gate arm.

6 Claims, 5 Drawing Figures

FIFTH WHEEL COUPLER ASSEMBLY

BACKGROUND OF THE INVENTION

The invention relates to a fifth wheel coupler assembly carried on a tractor to engage a king pin on a trailer.

The prior art has many forms of fifth wheel coupler assemblies. A "dual-jaw" coupler assembly is disclosed in U. S. Pat. No. 3,485,513, patented Dec. 1969 to The Dayton Steel Foundry Company. A coupler assembly as shown in this patent is strong, rugged and capable of absorbing the impact loads when a king pin is not properly positioned in relation to the assembly during coupling.

The prior art also has fifth wheel coupler assemblies using a "single-jaw," such as disclosed in U. S. Pat. No. 3,079,175, February 1963, and U. S. Pat No. 3,600,006, August 1971. A single-jaw coupler assembly has fewer parts requiring less machining and is therefore produced at a lower cost.

However, it is known that the orientation plane of the king pin during coupling is extremely critical, particularly for a single-jaw coupler assembly. If the king pin is too high the impact loads during coupling contact may damage the coupler assembly so as to cause miscoupling or accidental droppage of the trailer.

SUMMARY OF THE INVENTION

The object of the invention is to provide an improved fifth wheel coupler assembly.

It is a further object of the invention to provide a fifth wheel coupler assembly having a coupler jaw which will not close if the orientation plane of the king pin during coupling is not correct or too high.

Still further, it is an object of the invention to provide a single-jaw fifth wheel coupler assembly which will not be damaged by incorrect king pin orientation and which will also be relatively inexpensive to manufacture.

These and other objects of the invention, and the advantages thereof, will be apparent in view of the Description of a Preferred Embodiment as set forth below.

In general, a fifth wheel coupler assembly according to the invention has a top plate with a rear opening formed by divergent leg portions, the opening terminating in a longitudinally elongated medial slot for receiving a trailer king pin. The coupler jaw is pivoted at one side of the slot beneath the top plate and has a gate arm swingable across the slot. The gate arm has a surface adapted to engage a king pin in coupled condition. The gate arm is maintained in a coupled condition by a locking bar having a sliding pivot and movable beneath the top plate transversely of the slot. The coupler jaw of the invention is further characterized by a sensor arm projecting into the slot when the assembly is in the open or king pin receiving condition and having an orientation such that the jaw will not close if the king pin is in a plane so as not to correctly engage the coupling surface of the gate arm.

In the preferred embodiment, the gate arm has a coupling surface that is substantially semi-circular and the sensor arm has a reaction surface for contacting the king pin with a radius larger than the coupling surface of the gate arm.

Also in the Preferred Embodiment, the coupling jaw has working surfaces, in addition to the two king pin engaging surfaces and the surface for contact with the locking bar, for releasing of a king pin from the coupled condition and for holding the assembly in the open condition. These latter two surfaces are selectively engaged by a surface on the locking bar which is mounted on a sliding pivot.

DETAILED DESCRIPTION OF THE INVENTION

Figure 1:
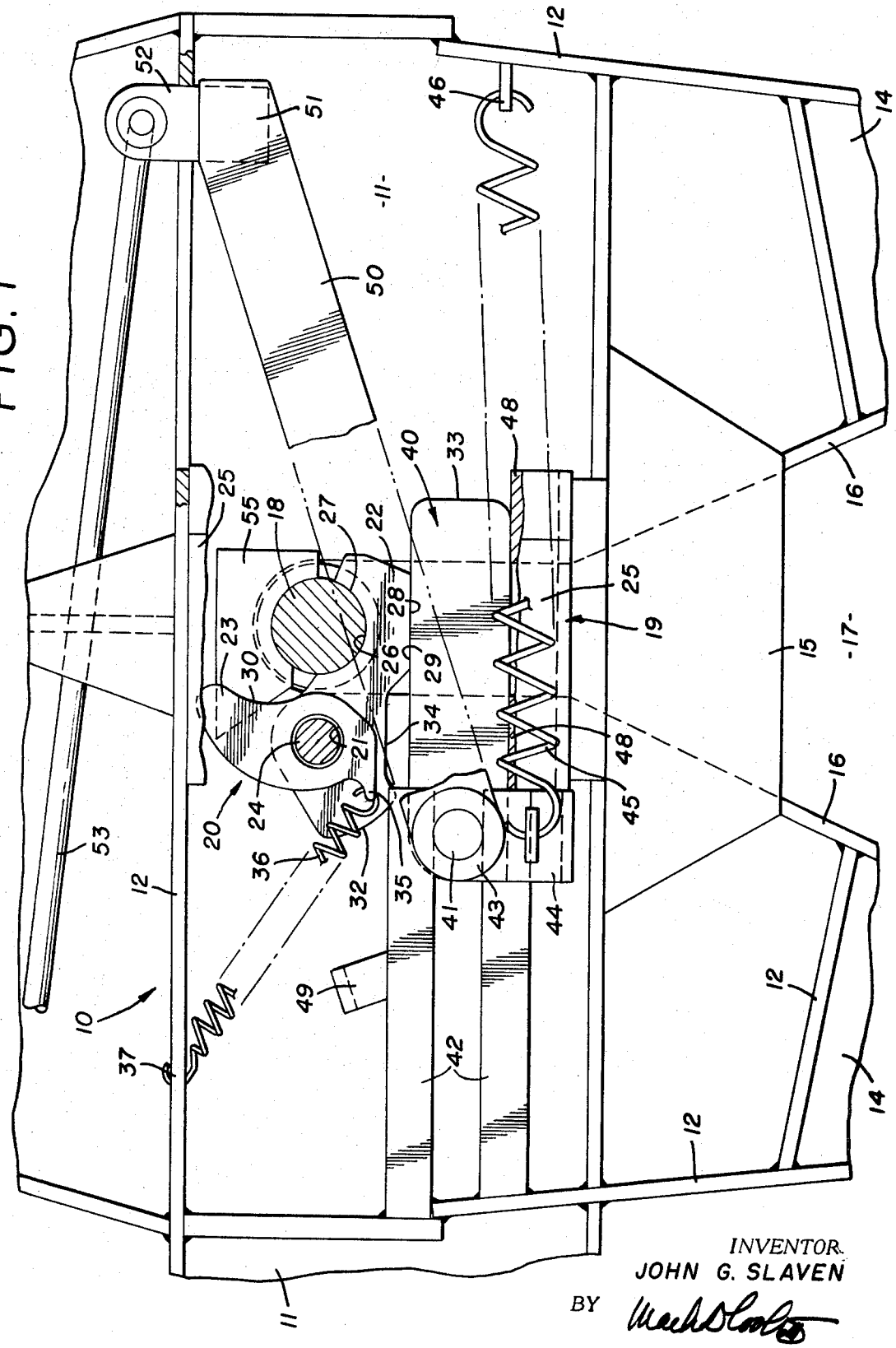
FIG. 1 is a fragmentary bottom plan view of a fifth wheel coupler assembly according to the invention, with the coupler jaw in contact with the locking bar, in a closed or king pin engaging condition.

A fifth wheel coupler assembly according to the invention, referred to generally by the numeral 10, is incorporated in a fifth wheel having a top plate 11 of conventional shape with a peripheral flange (not shown) and strengthening webs 12. The fifth wheel is secured to the rear platform of a tractor in a conventional manner. The rear portion of the top plate has rearwardly divergent leg portions 14 reinforced by a bottom web plate 15. The inner edges 16 of the leg portions 14 define a guide opening 17 for movement of the king pin, indicated generally by the numeral 18, into the longitudinally elongated medial slot 19. The king pin 18 when inserted into the king pin slot 19 will contact the coupler jaw, indicated generally by the numeral 20.

A coupler jaw 20 according to the invention has a body portion with a bore 21 therethrough, a projecting portion carrying a gate arm 22 and another projecting portion carrying a sensor arm 23. The general configuration of such a coupler jaw is fairly described as bifurcated in the sense of having two branches or parts, extending from an area of intersection. It is to be noted that the term "bifurcated" is not intended to connote a similarity in construction with the "dual or bifurcated opposed coupling jaws 25L and 25R" as disclosed in U. S. Pat. No. 3,485,513, patented December 1969.

The coupler jaw 20 is pivotally attached to the top plate 11 by a mounting pin 24. The mounting pin 24 preferably has a diameter less than the diameter of the bore 21, so that th coupler jaw 20 will have a capability for a "slack" movement in relation to the mounting pin and will therefore be relatively maintenance free and less subject to damage. When in position around the mounting pin 24, the coupler jaw 20 is retained by a web plate 25 extending longitudinally of the coupler assembly 10.

The gate arm 22 of the coupler jaw has an engaging surface 26 with a radius conforming to the diameter of the locking surface 27 of a king pin 18. Opposite to the king pin engaging surface 26, the gate arm 22 has a planar locking surface 28 intended for selective engagement with a mating surface 29 of a locking bar, as described in further detail below.

The sensor arm 23 of the coupler jaw has a reaction surface 30 with a radius greater than the diameter of the lower surface 31 (See FIG. 5) of a king pin 18 so as to ensure that a properly oriented king pin will contact the sensor arm 23 during movement through the slot 19.

The coupler jaw 20 has working surfaces in addition to the king pin engaging surfaces 26 and 30 and the locking surface 28, for releasing of a king pin 18 from the coupled condition and for holding the coupler assembly 10 in the open condition. The king pin releasing surface 32 is on an extension of the gate arm 22 and has a radiused profile for moveable engagement with the leading surface 33 of the locking bar 40, as further described below. The surface 34 for holding the coupler assembly 10 in the open condition is on the side of the gate arm 22, between the releasing surface 32 and the locking surface 88. The surface 34 has an indented profile for holding engagement with the leading surface 33 of the locking bar 40, also as further described below.

The sensor arm 23 has a rearwardly extending flange 35 to provide a connector for one end of a tension spring 36. The other end of the spring 36 is connected as a 37 to a strengthening web 12. When the coupler jaw 20 is in the open condition, the spring 36 applies a bias or force tending to rotate the coupler jaw, clockwise as shown in FIGS. 1-4.

The locking bar, indicated generally by the numeral 40, is a rectangular element having a sliding pivot 41 movable transversely to the king pin slot 19. The pivot pin 41 is confined between parallel guide bars 42. The pivot pin 41 is secured between the guide bars 42 as by a coupling element 43 having a rearwardly directed lever flange 44. The flange 44 provides a connector for one end of a tension spring 45. The other end of the spring 45 is connected as at 46 to a strengthening web 12. When the locking bar 40 is moved transversely away from the slot 19, the spring 45 applies a bias or force tending to rotate the locking bar, counterclockwise as shown in FIGS. 1-4.

The locking bar 40 is confined, when extending transversely of the king pin slot 19 with the surface 29 in locking engagement with the surface 28 of the coupler jaw 20, by a pair of abutments 48. The abutments 48 extend between the top plate 11 and the web plate 25 and transmit the pulling load of the king pin 18 to the coupler assembly 10. The locking bar 40 is also confined, when forwardly rotated with the surface 33 in movable engagement with the surface 32 of the coupler jaw 20, by an abutment 49. The abutment 49 extends between the top plate 11 and the forward guide bar 42.

To open the coupler jaw 20 for release of the king pin 18, the locking bar pivot pin 41 is moved transversely away from the king pin slot 19. As shown, the mechanism for moving the locking bar 40 include a forwardly projecting throw arm 50 connected at one end to the coupling element 43. The other end of the arm 50 is connected as at 51 to a slide bar 52 carried on a strengthening web 12. The forward end of the slide bar 52 is connected to an actuating rod 53. The actuating rod 53 extends outwardly of coupler assembly 10 beneath the top plate 11. Manual actuation of the rod 53 by a handle (not shown), in the direction of the arrow, will move the locking bar 40 from locking engagement with the coupler jaw 20.

Figure 2:
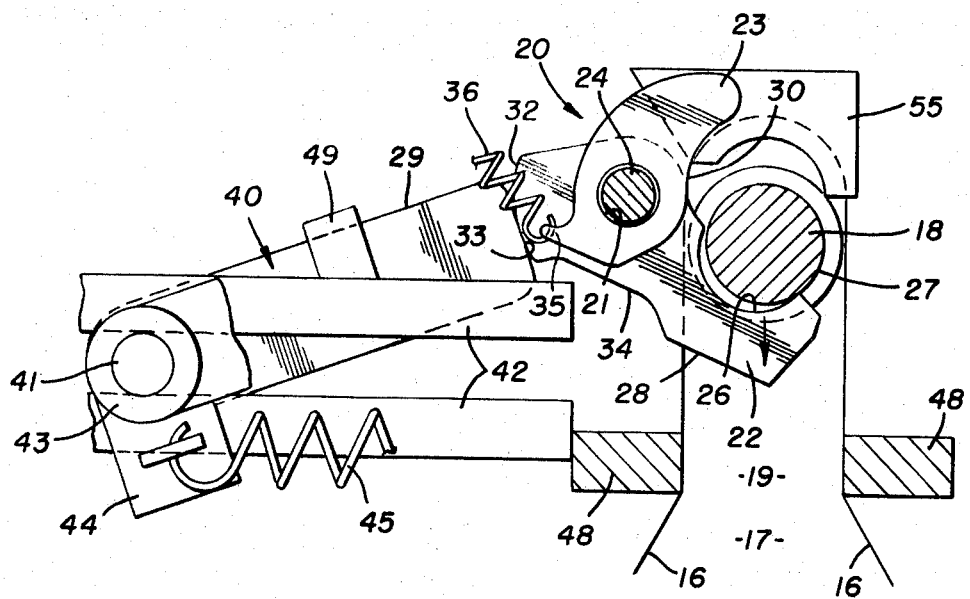
FIG. 2 is a plan view for showing the coupler jaw in a king pin releasing or opening condition.

Referring to FIG. 2, when the locking bar 40 has been moved from locking engagement with the coupler jaw by actuating of the rod 53, the locking bar 40 will be pivoted forwardly by the action of spring 45 into engagement with abutment 49. The leading surface 33 of the locking bar 40 will be in movable engagement with the king pin releasing surface 32. Thereafter, the tractor carrying the coupler assembly 10 can be moved away from the king pin 18, in the direction of the arrow.

Figure 3:
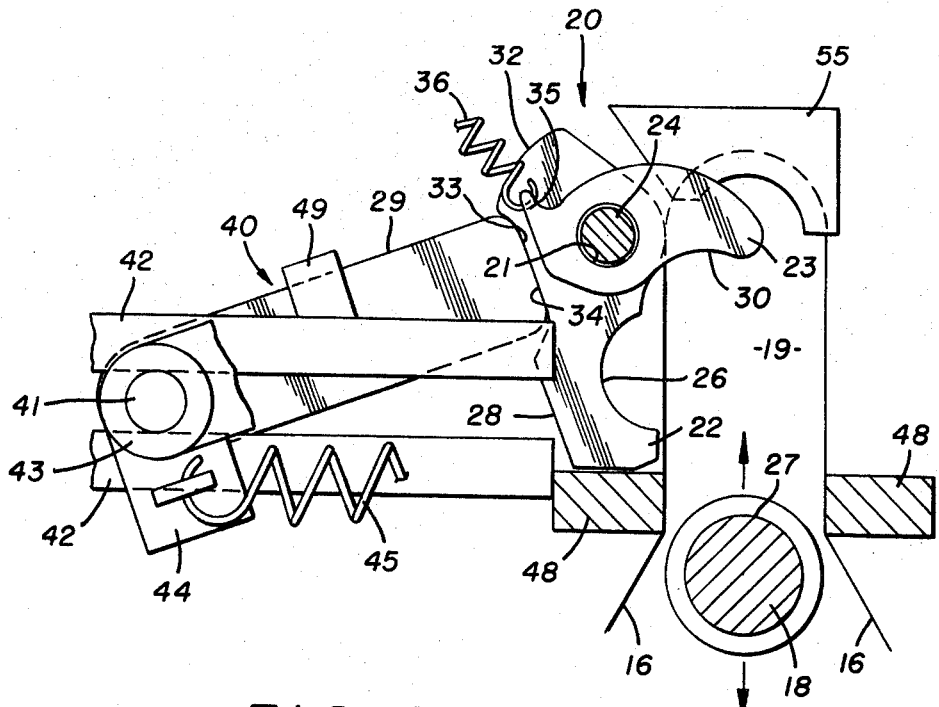
FIG. 3 is a plan view for showing the coupler jaw in an open or king pin receiving condition.

As the king pin 18 moves out of the slot 19, before the coupler assembly 10 has assumed the condition shown in FIG. 3, the gate arm 22 will be swung out of the slot 19 and the leading surface 33 of the locking bar will move into locking engagement with the coupler jaw holding surface 34.

Figure 4:
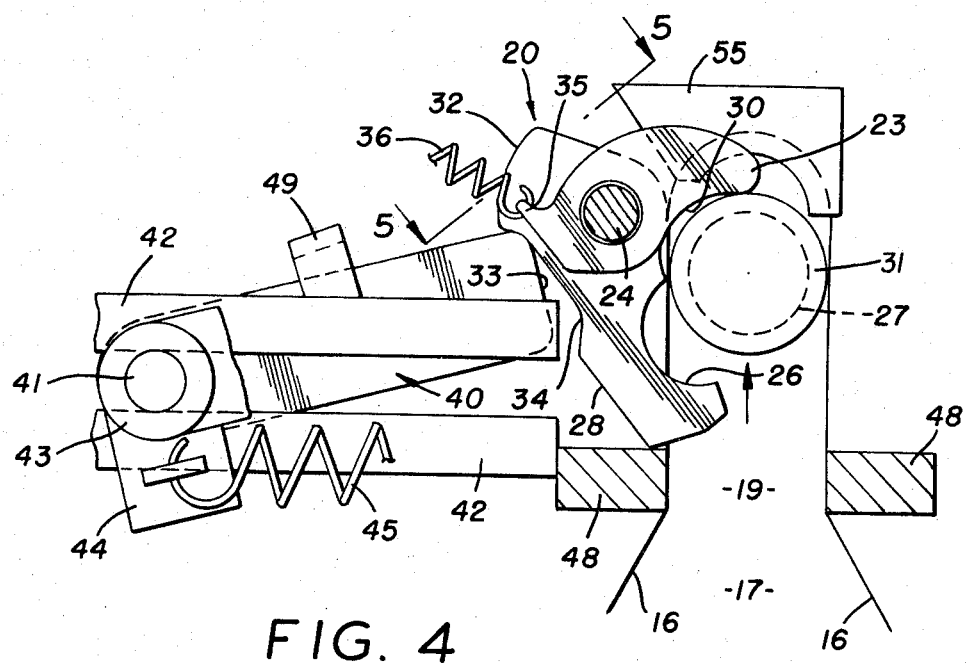
FIG. 4 is a plan view for showing the coupler jaw in a closing condition with the king pin in the correct orientation plane.
Figure 5:
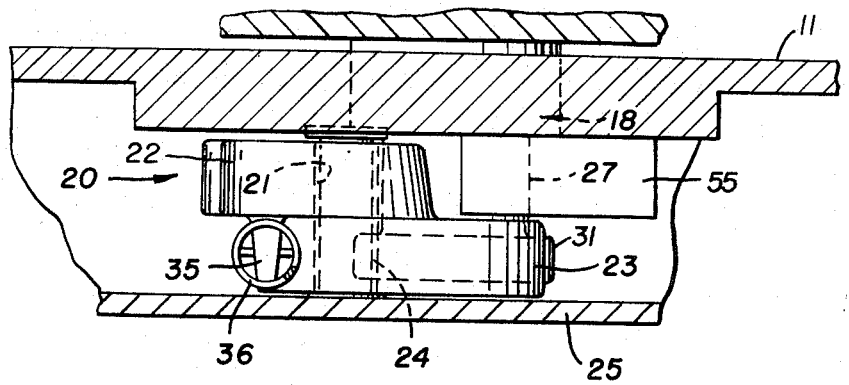
FIG. 5 is a fragmentary view in cross-sectional elevation, taken substantially as indicated on line 5—5 of FIG. 4 and inverted 180°, showing the coupler jaw in contact with a properly oriented king pin.

As a king pin 18 moves into the slot 19, the sensor arm surface 30 will have been positioned by the action of spring 36 for contact with the king pin surface 31. As shown in FIGS. 4 & 5, if the king pin 18 is in the correct orientation plane, the coupler jaw holding surface 34 will be released from locking engagement with the locking bar surface 33 and the coupler jaw 20 will rotate to bring surface 26 into engagement with king pin surface 27. The locking bar 40 will then move to the position of FIG. 1 and the king pin 18 will be enclosed between the gate arm surface 26 and a stop plate 55 carried on the top plate 11 at the forward end of the slot 11.

In the event that the orientation plane of the king pin 18 is too high, the king pin will pass over the sensor arm 23 and may contact the stop plate 55, but the coupler jaw 20 will not close.

What is claimed is:

1. A fifth wheel coupler assembly having a slot for receiving a king pin, a coupler jaw pivoted at one side of said slot and having a gate arm swingable across the slot with a surface adapted to engage a king pin in coupled condition, and a locking bar movable into engagement with said coupler jaw, characterized in that,
   said locking bar is mounted on a sliding pivot movable transversely to said slot.

2. A fifth wheel coupler assembly according to claim 1 further characterized in that, there is a surface on an extension of said gate arm with a radiused profile for movable engagement with a leading surface on said locking bar.

3. A fifth wheel coupler assembly according to claim 2, further characterized in that, there is a surface on the side of said gate arm with a recessed profile for holding engagement with said locking bar leading surface.

4. A fifth wheel coupler assembly according to claim 2, further characterized in that, upon movement of said locking bar away from said slot a rotating force is applied thereto so that said locking bar leading surface is brought into movable engagement with said gate arm surface having the radiused profile.

5. A fifth wheel coupler assembly according to claim 4, further characterized in that, upon movement of said locking bar away from said slot a rotating force is applied thereto so that said locking bar leading surface is brought into movable engagement with said gate arm surface having the radiused profile and so that upon movement of a king pin out of said slot said locking bar leading surface is brought into holding engagement with said gate arm surface having the recessed profile.

6. A fifth wheel coupler assembly having a slot for receiving a king pin, said king pin having a locking surface (27) and a lower surface (31), said locking surface being of smaller diameter than said lower surface, a bifurcated coupler jaw (20) pivoted at one side of said slot and having a gate arm (22) swingable across the slot to engage said king pin locking surface in coupled condition, and a locking bar (40) movable transversely of said slot into and out of engagement with said coupler jaw, characterized in that, said gate arm has an engaging surface (26) with a radius conforming to the diameter of said locking surface on a king pin, said coupler jaw further having a sensor arm (23) projecting into the slot when said assembly is in the open condition with said locking bar moved transversely of said slot and out of engagement with said coupler jaw, said sensor arm having a reaction surface (30) with a radius greater than the diameter of said lower surface on a king pin whereby, said coupler jaw will not close if said lower surface on a king pin is in a plane so as not to engage said reaction surface on a sensor arm during movement of said king pin into said slot.

* * * * *